United States Patent Office 2,725,364
Patented Nov. 29, 1955

2,725,364

VINYL HALIDE POLYMERS PLASTICIZED WITH DIESTERS OF ACID DERIVATIVES OF 2-BENZO-THIAZOLYL MERCAPTAN

Joachim Dazzi, Dayton, Ohio, assignor to Monsanto Chemical Company, St. Louis, Mo., a corporation of Delaware No Drawing. Application December 31, 1952,
Serial No. 329,101

2 Claims. (Cl. 260—30.2)

This invention relates to new resinous compositions of matter having utility under widely varied conditions. More particularly the invention relates to the use of a di-ester of an acid derivative of 2-benzothiazolyl mercaptan as a plasticizer for vinyl halide resins.

The primary purpose of this invention is to provide improved plasticizers for vinyl halide resins such as vinyl chloride. A further purpose of this invention is to pro vide new resinous compositions which are resistant to the solvent action of hydrocarbons. A still further purpose of this invention is to provide inexpensive resinous compositions which retain the plasticizer at elevated temperatures.

It has been found that the di-esters of acid derivatives of 2-benzothiazoylyl mercaptan are efficient plasticizers for vinyl halide polymers such as vinyl chloride. Examples of such esters are the succinate esters having the following structural formula:

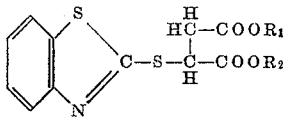

where R₁ and R₂ are each monovalent aliphatic radicals selected from the group consisting of hydrocarbon radicals having from 3 to 12 carbon atoms and oxahydrocarbon radicals having from 3 to 12 carbon and oxygen atoms.

A preferred compound is the di-n-butyl succinate derivative, but other alkyl succinates having from 3 to 7 carbon atoms may similarly be employed. This preferred class of plasticizers also includes the ester derivatives of di-n-propyl succinate, di-isopropyl succinate, di-isobutyl succinate, di-n-hexyl succinate, and di-n-heptyl succinate. Broadly stated, the present class of plasticizers includes the di-esters of 2-benzothiazolyl mercaptan as plasticizers for vinyl halides. The compounds which may thus be employed are those which may be prepared by reacting 2-benzothiazolyl mercaptan (also called mercaptobenzothiazole) with a dicarboxylic unsaturated acid such as maleic, fumaric or itaconic acid. Such derivative is then esterified with an alcohol, of which the following are typical examples: n-propanol, isopropanol, n-butanol, tert.-butanol, n-amyl alcohol, 2-ethylhexanol, the cyclohexanols, tetrahydrofurfuryl alcohol, the various nonyl alcohols, the normal alcohol and branched chain dodecyl alcohols, 2-ethoxyethyl alcohol, 2(n-butoxy)-ethyl alcohol, and other aliphatic monohydric alcohols having 3 to 12 carbon atoms and the corresponding alcohols which have one or more CH₂ groups replaced by oxygen atoms. Mixed esters derived from two different alcohols may also be employed. The preparation of the present plasticizers may also be carried out by the direct reaction of 2-benzothiazolyl mercaptan with an ester derived from the above acids and alcohols.

When the plasticizers are made by esterification of 2-benzothiazolylmercaptosuccinic acid, a salt is first prepared by heating at from 30° C. to 60° C. an aqueous alkaline solution of 2-mercaptobenzothiazole and the sodium salt of maleic or fumaric acid. The corresponding acid is recovered by acidification and filtration. The esters are prepared from the acid by refluxing the acid with the desired alcohol of the type described above in the presence of a suitable esterification catalyst and separating the evolved water by a suitable continuous method, for example, with a Dean and Stark trap.

The new compounds are valuable plasticizers for polyvinyl chloride and copolymers of more than 70% of vinyl chloride and up to 30% of other monomers copolymerized therewith such as another polymerizable monoethylenically unsaturated monomer, for example, vinyl acetate, esters of monocarboxylic acids, acrylonitrile, vinylidene chloride and vinylidene fluoride.

The plasticizers are blended with the vinyl resin in the conventional manner, for example, by mixing on a roll mill, a Banbury type mixer or any other suitable mixing device. The plasticizers are used in proportions necessary to achieve the desired plasticity. Although the quantity of plasticizer will depend upon the particular polymer to be plasticized, it is generally found that from 5% to 60% of plasticizer will, in most cases, produce a satisfactory composition for general utility. Such quantity of plasticizer will generally remain as a permanent part of the vinyl resin and the modified vinyl resin so prepared will not deteriorate by contact with liquid hydrocarbons or become embrittled by reason of the loss of the plasticizer during use. The present dicarboxylic esters are of particular utility in the improvement of stability of vinyl resins against hydrocarbon deterioration.

The value of the plasticizers is estimated by three tests: (1) compatibility, (2) volatility, and (3) extraction by hydrocarbons. The compatibility is determined by visual inspection for cloudiness or exudation of the plasticizer, clarity being a requisite in many applications for vinyl chloride polymers. The volatility is estimated by heating the plasticized resin at 105° C. for 24 hours and determining the percentage of the plasticizer evaporated by loss of weight. The hydrocarbon solubility test performed with kerosene as a typical liquid hydrocarbon is determined by submerging a sample of the plasticized polymer in kerosene at a constant temperature of 25° C. for a period of 96 hours and thereafter determining the extraction resulting from contact with the solvent. The kerosene employed in this test has a boiling range of about 200° C. to 250° C., corresponding to an average hydrocarbon chain length of 13 carbon atoms. Of these tests the compatibility is of primary importance, while the others are only critical for certain applications. If the plasticized polymer is to be subjected to elevated temperatures, a volatility of 4% to 10% or less is advantageous, otherwise volatilities as high as 25% are often not objectionable. The volatilities and hydrocarbon extraction values of polymer plasticized blends are difficult to predict and often have no apparent relationship to the physical constants of the plasticizer.

The new plasticizers are of general utility in softening vinyl chloride polymers and are effective over a wide range of temperatures. They may be used as the only plasticizing component in a compounded vinyl chloride polymer or they may be used in conjunction with other plasticizers.

Specific examples of the practice of this invention are:

Example 1

A solution of 0.5 mole of 2-mercaptobenzothiazole and 0.75 mole of di-normal-butyl maleate was prepared in 100 g. of absolute ethanol. Five grams of sodium methylate was then added as a catalyst and the mixture was refluxed for a total of 5 hours at a temperature of about 80° C. An additional amount of 3 g. of the sodium methylate catalyst was added during the course of the reaction. The reaction mixture was diluted with ethanol and was then washed with dilute sodium hydroxide solution. The residual material was then dried over sodium sulfate and heated to a temperature of 200° in a distillation flask. The product was isolated by a fractional distillation at 1 mm. Hg to remove components boiling below 200° C. The residual product had a refractive index of $n_{25}^D = 1.5600$. Analysis of the product compared to the calculated values for $C_{19}H_{25}NO_4S_2$ gave the following:

*Analysis.*—Found S=16.40; calc. 16.32. C=57.82; calc. 57.35. H=6.42; calc. 6.34.

Example 2

Using test procedures described above, the efficiencies of the compound of Example 1 were tested as a plasticizer for polyvinyl chloride resin. A blend was prepared from 40 parts by weight of the ester, and milled until a homogeneous mixture was prepared. The volatility and hydrocarbon extraction were measured by the standard methods described above. The following table sets forth the observed data:

| Loss by Volatility | Loss by Hydrocarbon Extraction |
|---|---|
| Percent 4.38 | Percent 2.1 |

With regard to the hydrocarbon extraction values shown above, the improvement made possible by the present compounds is readily apparent by comparison with the well-known plasticizer dioctyl phthalate which has a hydrocarbon extraction value from vinyl chloride amounting to 84.8% under similar conditions.

The invention is defined by the following claims.

I claim:

1. A resinous composition of matter which comprises a polymer of at least 70% vinyl chloride and up to 30% of a polymerizable monomer compatible therewith and a compound having the structural formula:

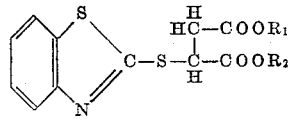

wherein $R_1$ and $R_2$ are each monovalent aliphatic radicals selected from the group consisting of hydrocarbon radicals having from 3 to 12 carbon atoms and oxahydrocarbon radicals having from 3 to 12 carbon and oxygen atoms.

2. A resinous composition comprising polyvinyl chloride and from 5 to 60% by weight of the di-n-butyl ester of S-2-benzothiazolylmercapto succinate.

References Cited in the file of this patent

UNITED STATES PATENTS 2,559,521    Smith et al.            July 3, 1951

FOREIGN PATENTS 845,793    France               Sept. 1, 1939